US006415816B1

(12) United States Patent
Beckey et al.

(10) Patent No.: US 6,415,816 B1
(45) Date of Patent: Jul. 9, 2002

(54) AIR ADMITTANCE VALVE ASSEMBLY

(75) Inventors: Thomas J. Beckey, Edina; Richard T. Stone, Minneapolis; Peter J. Nyvall, Richfield, all of MN (US)

(73) Assignee: Cherne Industries Incorporated, Minneapolis, MN (US)

(*) Notice: Subject to any disclaimer, the term of this patent is extended or adjusted under 35 U.S.C. 154(b) by 0 days.

(21) Appl. No.: 09/653,339

(22) Filed: Aug. 31, 2000

(51) Int. Cl.[7] ............................................... F16K 24/00
(52) U.S. Cl. .................................. 137/526; 137/323.27
(58) Field of Search ............................ 137/526, 533.27, 137/533.17

(56) References Cited

U.S. PATENT DOCUMENTS

| 1,734,361 A | * | 11/1929 | Bloom | ........................ 137/526 |
| 2,270,469 A | * | 1/1942 | Osborn, Jr. | ................... 137/526 |
| 2,736,338 A | * | 2/1956 | Britton | ....................... 137/526 |
| 4,628,959 A | * | 12/1986 | Parker et al. | ................ 137/526 |

FOREIGN PATENT DOCUMENTS

| EP | 0409506 | * | 7/1990 | .................. 137/526 |
| GB | 2112906 | * | 12/1981 | .................. 137/526 |

* cited by examiner

Primary Examiner—Michael Powell Buiz
Assistant Examiner—Meredith H. Schoenfeld
(74) Attorney, Agent, or Firm—Anthony G. Eggink

(57) ABSTRACT

A one directional flow valve assembly for a fluid system. The valve assembly is comprised of a valve body having an internal valve chamber in communication with the ambient environment with a valve seat of a predetermined configuration. The assembly further has a cap structure with means to position and align a sealing membrane with respect to the valve seat. A flexible elastomeric sealing diaphragm is provided which is under tension when the diaphragm is in a sealing configuration. A carrier plate structure may be provided to position the sealing diaphragm. The sealing member is in tension adjacent to the sealing seat when in a sealing position.

36 Claims, 11 Drawing Sheets

AIR ADMITTANCE VALVE ASSEMBLY

BACKGROUND OF THE INVENTION

This invention relates generally to a one directional flow valve assembly for a fluid system and particularly for permitting the ambient environment to equalize negative pressure differentials within the fluid system while preventing positive pressure gases from escaping into the ambient environment. The invention is particularly useful in providing an air admittance valve assembly for a plumbing system, such as an air admittance valve assembly constructed and arranged to provide an automatic one-way valve assembly for low pressure differentials to the drain portion of a plumbing system. The valve assemblies of the invention provide responsive and sensitive air inlet valves, constructed and arranged for indoor use environments to vent into plumbing systems.

A typical plumbing system supplies water and carries away waste. Water is supplied under pressure to the plumbing fixtures and drain pipes carry waste water from the fixtures to the main drain which empties into a sewer system, septic tank or the like. Ambient atmospheric pressure is typically maintained in the drainage system and gases are vented from the system by vent pipes that extend through the roof of the building structure. A drainage system may be referred to as the drain-waste-vent system (or DWV) in that it drains water, carries away solid waste and vents gasses outside the system. Each plumbing fixture typically has a trap which contains water to prevent gasses from entering the building through the fixture, e.g. sink or tub. The trap of a typical fixture is connected to a drain pipe, i.e., 1½ or 2 inch diameter. Waste from toilets is typically discharged through a 3 or 4 inch diameter soil pipe connected to the main drain.

At each trap of a fixture a vent extends from the drainage system to maintain atmospheric pressure. The vent at the toilet typically extends from the soil pipe and is referred to as the soil stack. Other fixtures are typically vented by a secondary vent or revent, i.e., 1½ inch diameter pipe which is connected to the main vent or they may be vented by a main vent extending through the roof.

Venting a plumbing system allows make-up air to enter the system to prevent a vacuum from forming which would pull water from the traps and into the drain pipes. Thus, plumbing systems typically have at least one main vent and preferably a vent at each fixture. Plumbing codes usually specify the requirements for venting plumbing installations.

It is presently common procedure in the construction and plumbing industries to utilize roof vent pipes for providing make up air when negative pressures are realized in drain and waste plumbing systems, such as when a sink is drained or a toilet is flushed. The installation of vent pipes, particularly secondary vents, is a time consuming and costly procedure in the building construction process. Particularly in home remodeling projects, for example, vent pipes are normally placed within the interior of wall structures and extend to the main vent or through the roof. Further, where wall space restrictions exist, such as in pre-manufactured homes, mobile homes and in other motor vehicles having plumbing drain and waste systems, vent pipes are cumbersome and difficult to install and utilize.

Building codes in several countries outside the United States permit the use of vent valve assemblies for venting drain and waste systems. Further, several States in geographic areas in the United States now also permit the use of vent valve assemblies for venting drain and waste systems. However, various codes and requirements must be met for use of such valve assemblies. For example, the American Society of Sanitary Engineering for Plumbing and Sanitary Research (ASSE) has promulgated performance requirements for air admittance valves for venting DWV Systems and venting drainage systems, i.e., ASSE/ANSI 1051. These performance requirements are increasingly being utilized by governmental and local regulatory agencies in promulgating and enforcing plumbing codes.

A clear need exists in the plumbing industry for an automatic valve assembly for reliably venting into a low pressure plumbing drain and waste system and several such assemblies have been proposed and utilized. However, these prior art valve assemblies have drawbacks and difficulties. For example, the reliability of these valve structures and the proper sealing at low pressures have been problematic in such prior art devices. Other valve structures utilize mechanical means to operate the sealing members and they utilize elements that may be attacked by environmental hazards and, thus, may become unreliable over time.

The air admittance valve of the present invention utilizes a very low-pressure seal that is gravity activated. The valve assembly includes an air inlet valve chamber and means to align the sealing membrane with respect to the valve seat of the valve chamber. The flexible sealing membrane is comprised of a thin membrane having different configurations and which are placed in a tensioned state when sealing. The flexible, tension membrane reduces the need for high precision and debris intolerant parts in the valve assembly while providing tight and reliable sealing at low pressure differentials, i.e. at 0.01 psi. This sensitive sealing result can be attained without the requirement for dust catching sealing adjuncts such as silicone oil or silicone grease. The air admittance valves according to the teachings of this invention permit valve opening and air admittance at negative pressure differentials of less than 0.02 psi.

Prior art valves either do not reliably seal to current American Society of Sanitary Engineering standard 1051 (ASSE/ANSI 1051) or require sealing adjuncts such as grease or oil to effect sealing at the 0.01 psi. standard. Prior art valve assemblies typically incorporate cantilevered elastomeric sealing structures which are structurally stiff enough in flexure to seal in the range of pressures that the air admittance valve is subject to. However, the prior art sealing structures must be soft enough in flexure to overcome manufacturing variability and, therefore, have inherent performance shortcomings.

In contrast to the sealing structures of the prior art, the tensioned membrane of the present invention is structurally soft in flexure which, therefore, is tolerant of manufacturing variability, e.g. of the valve seat, valve membrane guide, and sealing membrane structures. Performance of the present invention is less critical of manufacturing tolerances associated with the sealing interface than those of the previous art. The single sealing surface also permits higher contact pressures than dual sealing surfaces.

Specifically, for thin shell shapes of thickness t, flexural stiffness is approximately proportional to $t^3$ while strength in tension is proportional to t. Thus, the structure of the sealing membranes of the present invention are as soft in flexural stiffness as necessary to allow for manufacturing variances while maintaining adequate tensile strength to prevent failure of the sealing member in use. Prior art air admittance valves with cantilever sealing structures must trade off adequate flexural stiffness to handle the range of pressures that the air admittance valve is subjected to while simultaneously being soft enough flexurally to tolerate manufacturing variability. Consequently, these prior art cantilever designs require tighter manufacturing tolerances to attain similar sealing performance.

Because of the mathematical relationship between the membrane flexural stiffness and tensile strength as a function of membrane thickness, the sealing membrane of the present invention provides a very soft flexural structure with an adequately strong tension structure. Further, because of the cooperation of the sealing membrane with the structure beneath the sealing ring, excessive strain on the membrane is limited even at high pressures, e.g. greater than 50 psi. Thus a novel air admittance valve is provided by the teachings of the present invention.

It is the object of the present invention to provide an automatic air admittance valve which effectively and reliably permits ambient make up air under ambient pressure to enter and equalize a negative pressure differential in a plumbing drain and waste system while preventing the discharge of contaminated and undesirable gasses under positive pressure conditions. It is further the object of the present invention to provide a flexible sealing diaphragm for a gravity controlled low pressure air admittance valve assembly which is reliable and effective for venting into such plumbing systems.

SUMMARY OF THE INVENTION

The present invention provides an automatic, one-way air admittance valve assembly for low pressure venting into a closed system, such as a plumbing drain and waste system.

The air admittance valve is comprised of a valve body having an internally positioned valve chamber which is constructed and arranged to form an annular valve seat. An elastomeric flexible sealing membrane is provided for flexibly sealing against the sealing surface of the annular valve seat. The annular valve seat has a sealing edge with a predetermined sloping configuration. A valve cap is provided for attachment to the valve body and has means to position and guide the flexible sealing membrane with respect to the valve seat.

In one embodiment the flexible elastomeric sealing member is a tensioned membrane while sealing and in another embodiment the flexible sealing membrane has an interior portion and exterior and intermediate concentric portions of a specified cross-sectional profile. The latter embodiment is also tensioned while sealing. The valve cap further has means to guide the carrier structure to thereby position and place the sealing diaphragm onto the sealing surface of the annular valve seat. In one embodiment a carrier plate structure is provided for guiding the elastomeric diaphragm and for sealing the flexible diaphragm against the valve seat. The carrier structure has an annular body configuration for attachment to the diaphragm. The carrier structure further has a plurality of radiating structural ribs which extend upward toward the center hub.

Further provided are valve body configurations and, particularly, valve seat and cooperating flexible sealing diaphragm configurations which repeatedly seal so as to permit an air admittance valve to function in a low pressure plumbing environment.

It is an object of the invention to provide air admittance valve assemblies which are responsive at low pressures to comply with various plumbing codes and regulatory agencies.

These and other benefits of this invention will become clear from the following description by reference to the drawings.

DESCRIPTION OF THE PREFERRED EMBODIMENTS

Figure 1:
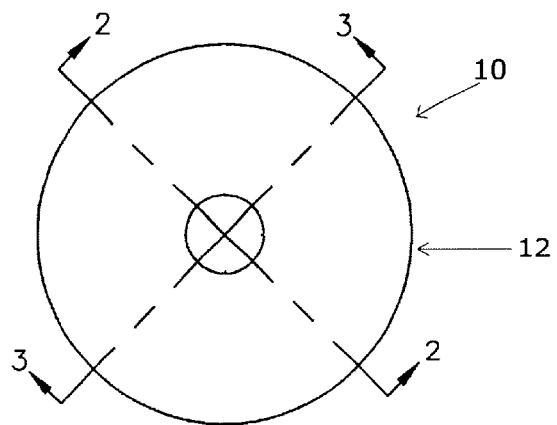
FIG. 1 is a top plan view of the air admittance valve assembly of the present invention.
Figure 2:
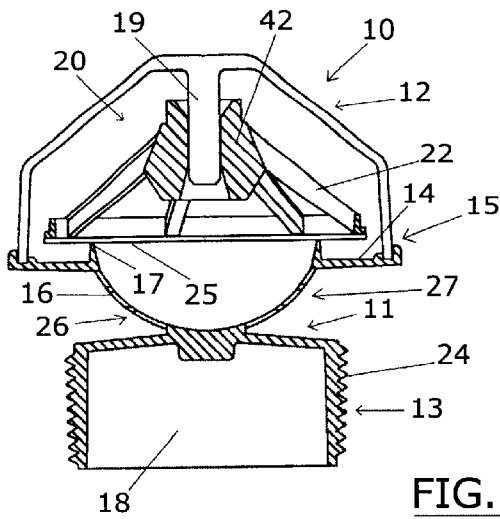
FIG. 2 is a sectional view of the valve assembly taken along line 2—2 of FIG. 1.
Figure 3:
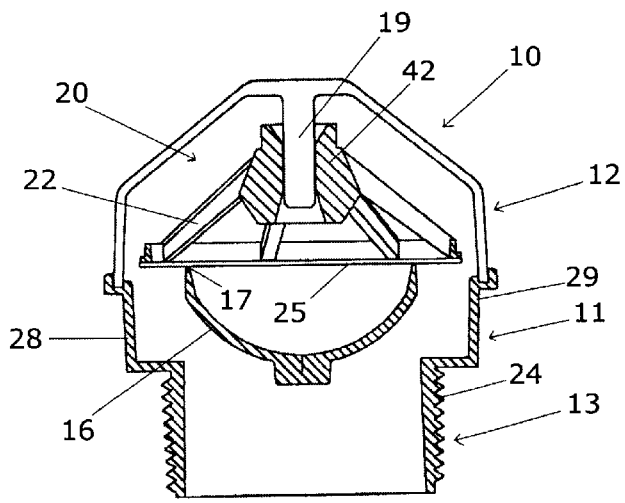
FIG. 3 is a sectional view taken along line 3—3 of FIG. 1.

Referring to FIGS. 1–3, the one-way valve assembly 10 is shown comprising a valve body 11 and a cap member 12 mounted thereon. The valve body 11 has a bottom connecting portion 13 which by means of external threads 24, for example, is connected to a closed system, such as a plumbing system. The valve assembly 10 is constructed and arranged for connection to the vent portion of a drain-waste-vent (DWV) plumbing system to permit ambient air to enter the system during negative pressure or vacuum conditions and to seal the drainage system during positive pressure conditions to thereby prevent gases from entering the ambient environment. The valve assembly 10 is constructed for connection to other systems requiring one-way venting from the ambient environment under low differential pressures, i.e., in the order of 0.01 psi.

The one-way valve assembly 10 is further shown to comprise a valve chamber 16 centrally disposed within the upper portion of the valve body member 11. The valve chamber 16 is shown to comprise a hemispherical or cupped wall terminating in an upwardly extending valve seat 17. Extending outwardly from the upper portion of the valve chamber wall is an upper peripheral portion 14 having a terminal connecting ridge 15 for receiving the bottom portion of the cap member 12. The threaded lower outer portion 13 is provided to permit the valve assembly 10 to be secured to an internally threaded conduit or pipe, for example, or to an adapter structure connected to the top of a vent pipe. The pipe threads are preferably NPT threads (National Pipe Threads). Although threads 24 are shown, alternative connecting means of the valve assembly 10 may be utilized, i.e., the use of adhesives or other connecting means.

Shown particularly in FIGS. 2 and 3, the cap member 12 has alignment means to position the flexible sealing membrane 25 with respect to valve seat 17. A centrally disposed guide member 19 is shown extending from the interior of the cap member 12. A sliding carrier structure 20 is shown positioned about the axially aligned guide member 19. The carrier structure 20 is comprised of a central hub 42 having a bore for sliding with respect to guide member 19. A plurality of structural ribs 22 are shown extending from the hub 42 and to the bottom of which a peripheral support is fixed for supporting the flexible sealing membrane 25 above the valve seat 17. The thin flexible elastomeric membrane 25 is preferably fixed to the bottom of the sliding carrier structure in a constrained state and is tensioned while sealing. In FIGS. 2 and 3, the sealing membrane 25 is shown sealingly positioned over the circumferential valve seat 17 of the valve chamber 16 thereby maintaining system gases within the valve body in communication with area 18.

Figure 2A:
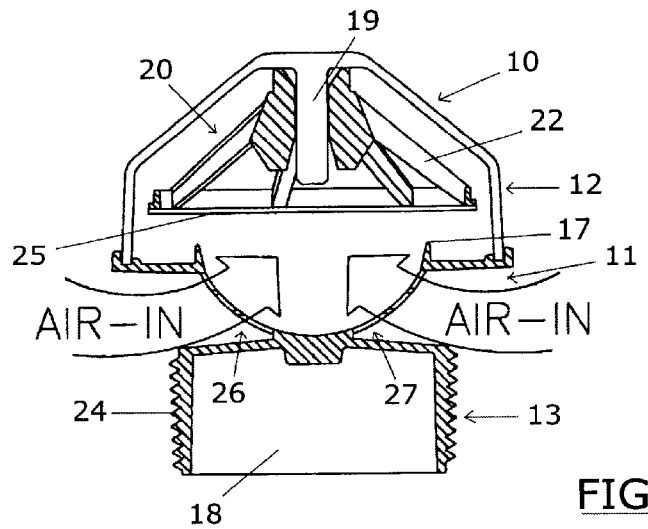
FIG. 2A is a sectional view of the valve assembly of FIG. 2 and showing the air inlet path of the air admittance valve.
Figure 3A:
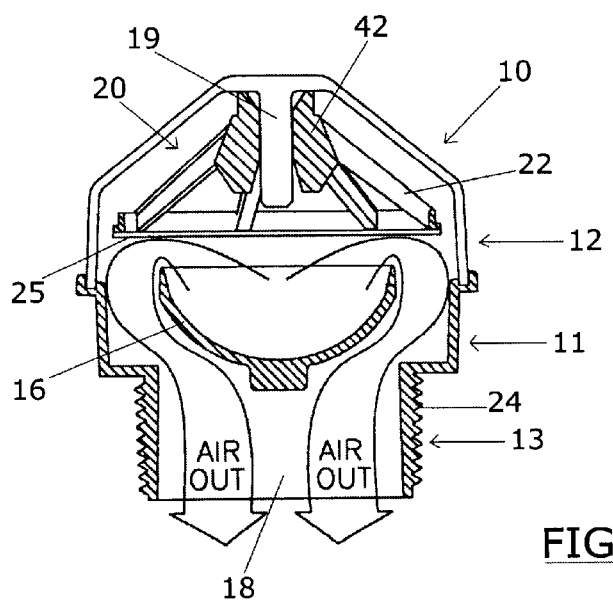
FIG. 3A is a sectional view of the valve assembly of FIG. 3 and showing the air admittance path of the valve assembly into the plumbing system.
Figure 5:
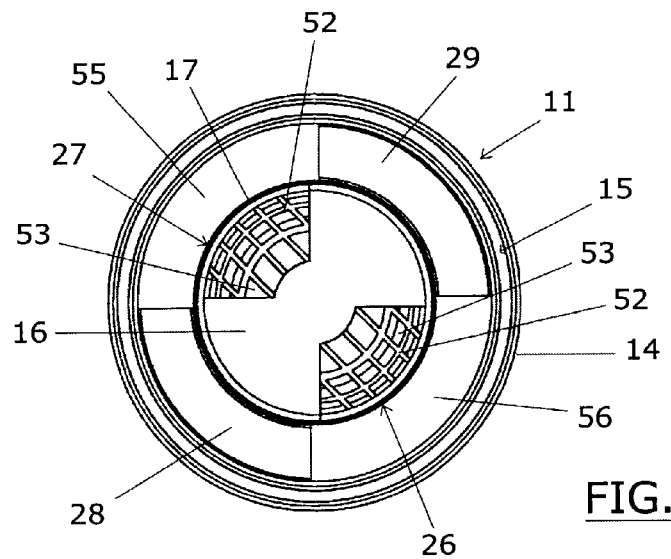
FIG. 5 is a top view of the valve body of the air admittance valve assembly.
Figure 6:
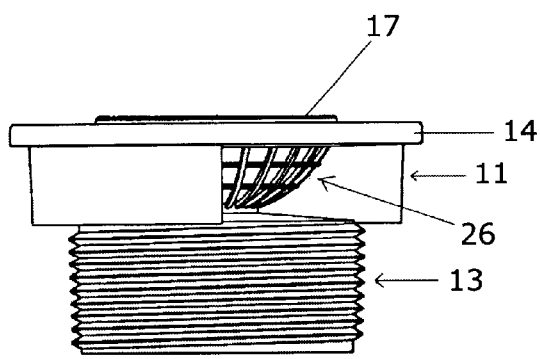
FIG. 6 is a lateral view of the valve body of FIG. 5.
Figure 7:
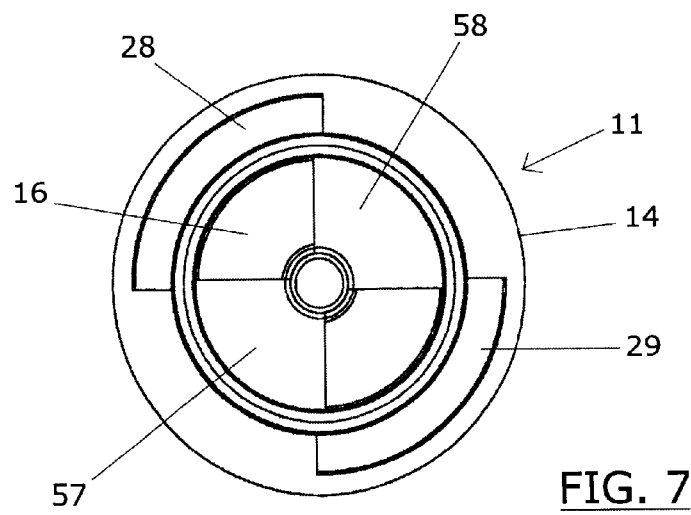
FIG. 7 is a bottom view of the valve body of FIG. 5.
Figure 8:
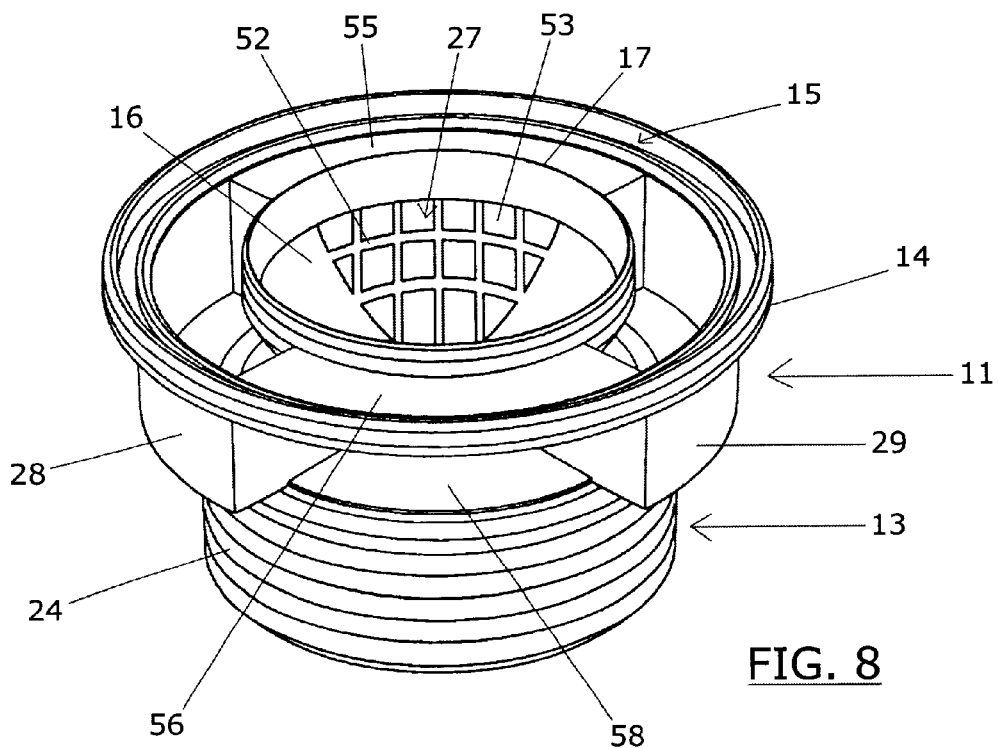
FIG. 8 is a perspective view taken from the top and side of the valve body of FIG. 5.
Figure 9:
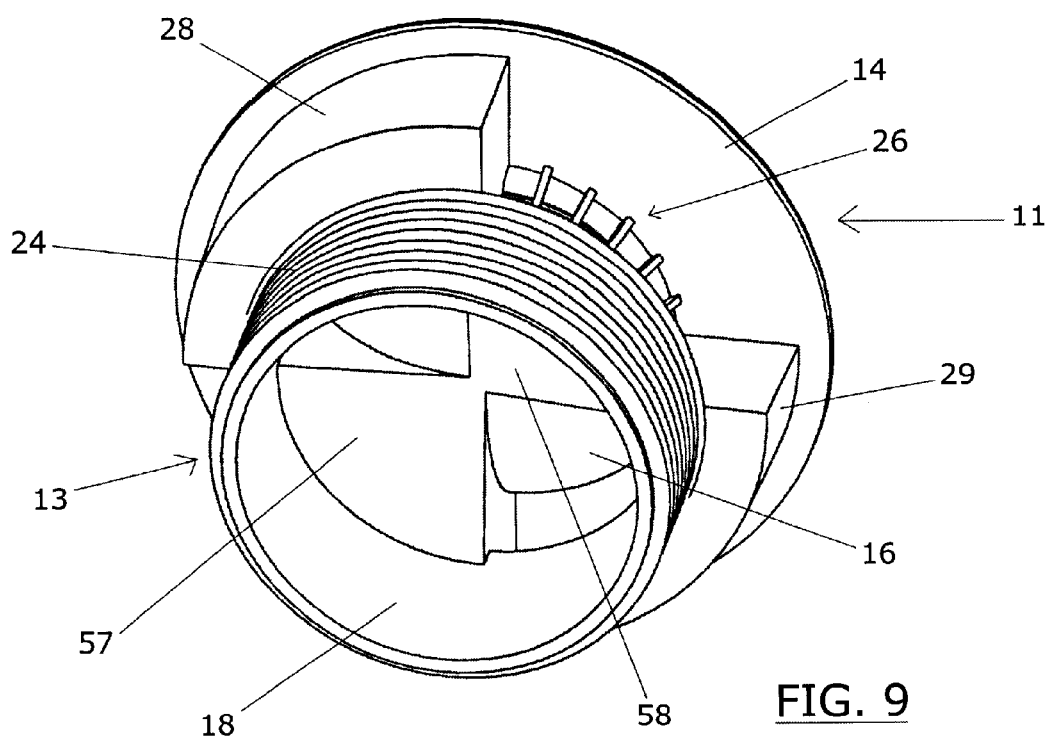
FIG. 9 is a perspective view taken from the bottom and side of the valve body of FIG. 5.

Referring to FIGS. 2A and 3A, the operation of the air admittance valve assembly 10 is shown. As shown, under negative pressure in the valve due to negative system pressure through valve area 18, the sealing membrane carrier structure 20 is lifted upward from valve seat 17 thereby permitting ambient air to enter the valve chamber 16 through air inlet areas 26 and 27 shown oppositely disposed in FIG. 2A. In FIG. 3A, which is a sectional view of the valve assembly 10 and which is 90° from that shown in FIG. 2A, the inlet air is shown entering the closed system through valve outlet portion 18 to thereby equalize the pressure differential between the closed system and the ambient environment.

Figure 10:
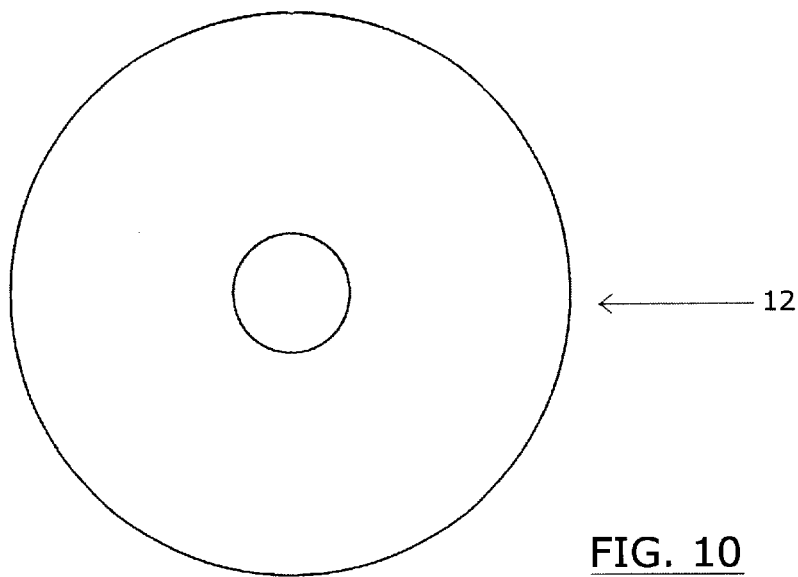
FIG. 10 is a top view of the cap member of the air admittance valve assembly of FIG. 1.
Figure 11:
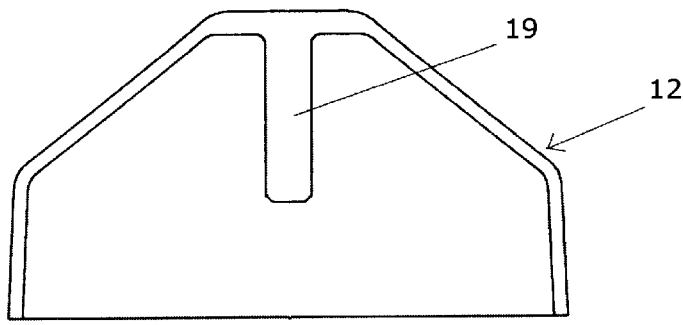
FIG. 11 is a sectional view of the cap member of FIG. 10.
Figure 12:
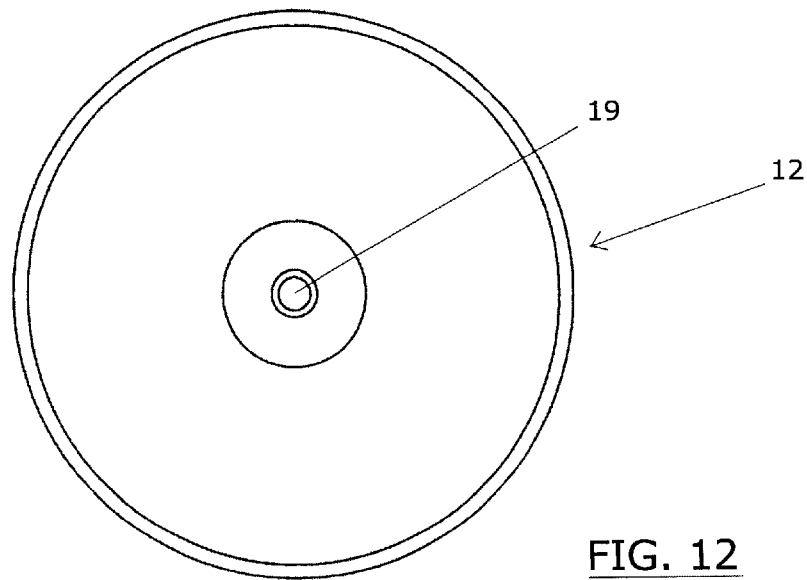
FIG. 12 is a bottom view of the cap member of FIG. 10.
Figure 13:
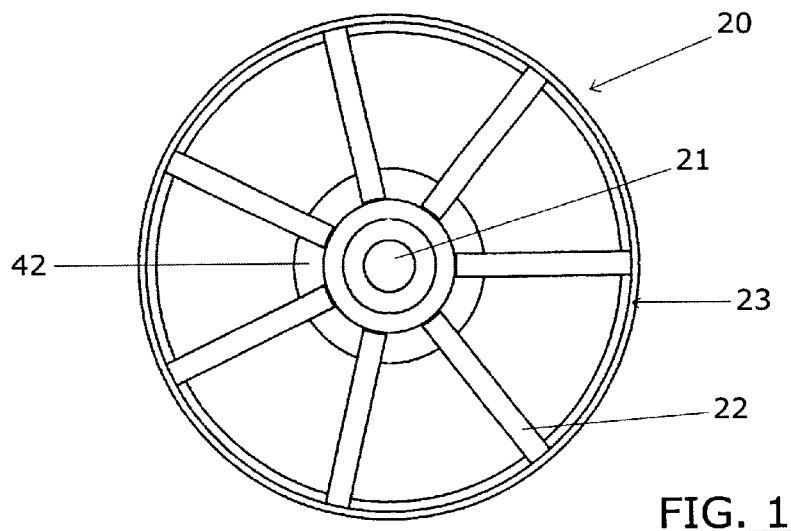
FIG. 13 is a top view of the carrier structure of the air admittance valve of FIG. 1.
Figure 14:
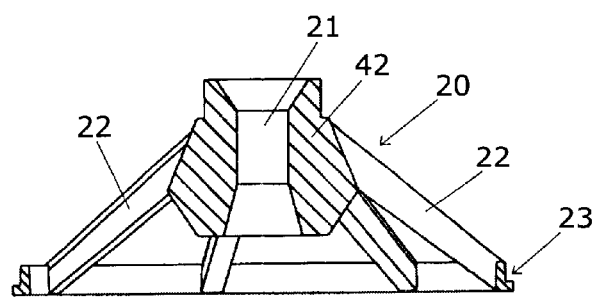
FIG. 14 is a lateral sectional view of the carrier structure of FIG. 13.
Figure 15:
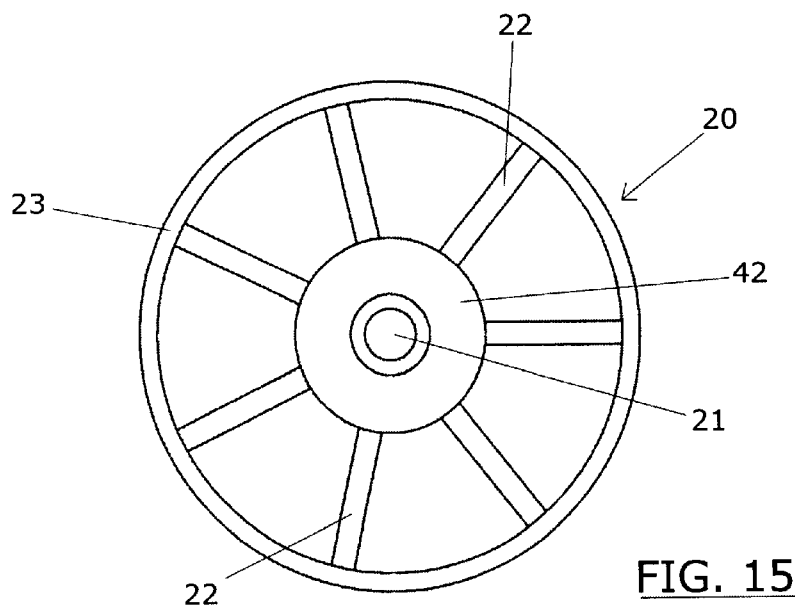
FIG. 15 is a bottom view of the carrier structure of FIG. 13.
Figure 16:
FIG. 16 is a sectional view of the sealing membrane taken along line 16—16 of FIG. 17.
Figure 17:
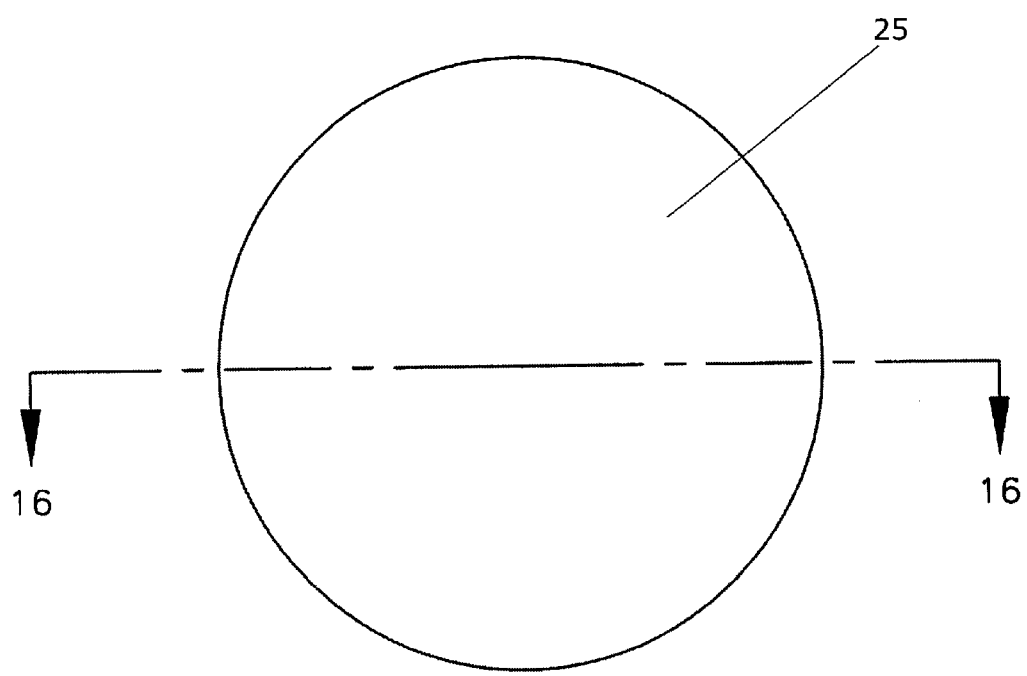
FIG. 17 is a top view of the sealing membrane of the air admittance valve assembly of FIG. 1.

The valve assembly 10 operation described is provided by the structural configuration of the valve body 11 further shown in FIGS. 5–9, in cooperation with the cap member 12 shown in FIGS. 10–12, the carrier assembly 20 shown in FIGS. 13–15 and the sealing membrane 25 shown in FIGS. 16 and 17.

Referring to FIGS. 5–9, the valve body member 11 is shown comprised of a tubular structure having an upper portion with a peripheral portion 14 having a ridge 15 for connection with the cap member 12. The cup shaped or hemispherical valve chamber 16 is shown positioned centrally in the valve body 11 and having the valve seat 17 extending upwardly therefrom. The valve chamber 16 is shown comprising a wall having generally four quadrants, including opposing apertured areas having web portions 52 forming apertures 53 which form opposing air inlet portions 26 and 27. The opposing apertured wall portions of the valve chamber 16 are shown to have a generally triangular configuration. The apertured wall portions are provided to keep debris and insects from entering the interior of the valve chamber 16 and to thereby secure the integrity of the sealing function of the sealing membrane on the valve seat 17. The upper peripheral portion 14 includes opposing walls 55 and 56 which connect the valve chamber 16 and define opposing air outlet chambers or ports 28 and 29. The latter outlet chambers 28 and 29 are in communication with the bottom outlet portion 18 of the valve body 11. As further shown the exterior connecting inner walls 57 and 58 of the opposing outlet ports 28 and 29 also form and provide funneled air inlet ports to the apertured walls of the valve chamber 16.

In FIGS. 10–12, the cap member 12 is shown comprised of a circular, unitary structure having a curvilinear downwardly sloping cross section. Centrally disposed is a downwardly extending guide member 19. The unitary cap structure 12 is preferably molded of a plastic composition, such as PVC or the like, and has a lower end for connection to the valve body member 11. Alternatively, the cap member 12 is provided as a clear molded plastic structure so that one is able to see the inner workings of the device so that users may see the parts and operation of the device.

In FIGS. 13–15, the carrier structure 20 is shown comprised of a central hub 42 having a guide bore 21 for slidably engaging the guide member 19 of cap member 21. Extending angularly and downwardly from the central hub 42 are a plurality of equidistantly spaced structural ribs 22. An annular support ring 23 is shown connected to the bottom of the structural ribs 22 and which is constructed to hold the sealing membrane thereto. The carrier structure 20 is also preferably molded of a unitary plastic composition such as PVC or the like.

Figure 4:
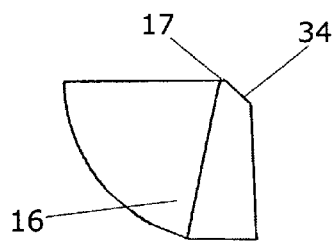
FIG. 4 is an enlarged sectional view of the valve seat of the air admittance valve assembly.

In FIGS. 16 and 17 the sealing membrane 25 is shown comprised of a thin circular structure. The sealing membrane 25 is preferably constructed of an elastomeric material which is fixed in a constrained state to the support ring 23 of the carrier structure 20. For example, the sealing membrane 25 may be adhesively fixed at its peripheral edge or otherwise mechanically attached by means, for example, of a formed lip to the support ring 23. As shown in previous drawings, the sealing membrane 25 and support ring 23 have a diameter intermediate the diameters of the valve seat 17 and the bottom of the cap member 12. This arrangement permits the support ring 23 to exert the weight of the carrier structure 20 to the sealing membrane 25 concentrically outside of the valve seat 17 to thereby flex the sealing membrane 25 about the valve seat 17. As shown in FIG. 4, the valve seat 17 in cross section is shown to have a sealing edge formed of a rounded edge and an angled wall edge 34 which provides a relief area for the tensioned sealing membrane when in the sealing position. Thus, the thin elastomeric sealing membrane 25 is able to reliably seal against the valve seat 17 in a flexed condition.

An air admittance valve assembly 10 for connection to a vent structure having 1.5 inch NPT threads, exemplary dimensions for the valve body 11 constructed of a rigid PVC composition may be as follows: upper outside diameter of approximately 2.6 inches, lower connecting portion outside diameter of approximately 1.9 inches and a height of approximately 1.4 inches. The centrally disposed valve seat has a seat diameter of approximately 1.5 inches, a rounded valve seat edge having a radius of approximately 0.003 inches, sloping wall of approximately 135 degrees and a height of approximately 0.016 inches. The cap member 12 constructed of rigid PVC may have a lower outside diameter of approximately 2.5 inches, an inside diameter of approximately 2.38 inches, a height of approximately 1.26 inches and a guide member with a length of approximately 0.75 inches. The sloped portion of the cap member is disposed at approximately 51° with respect to a central axis through the guide member. The slidable carrier structure 20 is also constructed of rigid PVC has a lower outside diameter of approximately 2.14 inches, an upper hub diameter of approximately 0.50 inches with a bore of approximately 0.22 inches and an overall height of approximately 0.91 inches. The equally spaced ribs have a width of approximately 0.10 inches. The sealing membrane or diaphragm 25 is preferably constructed of a flexible elastomeric material, such as neoprene rubber or the like and has a thickness of approximately 0.030 inches and a diameter of approximately 2.20 inches. Other valve assembly dimensions, valve attachment means material and other compositions used in the valve assembly are within the purview of this invention.

Figure 18:
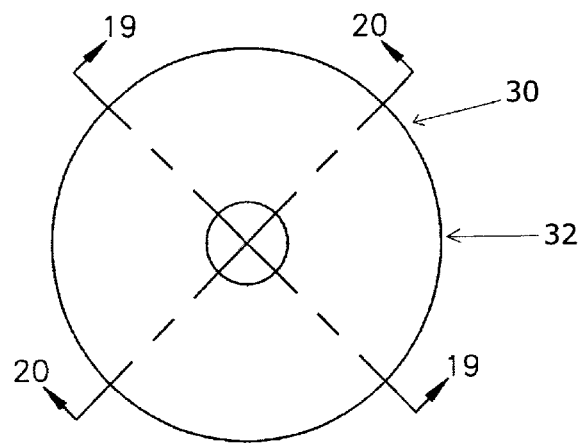
FIG. 18 is a top plan view of another embodiment of the air admittance valve assembly of the invention.
Figure 19:
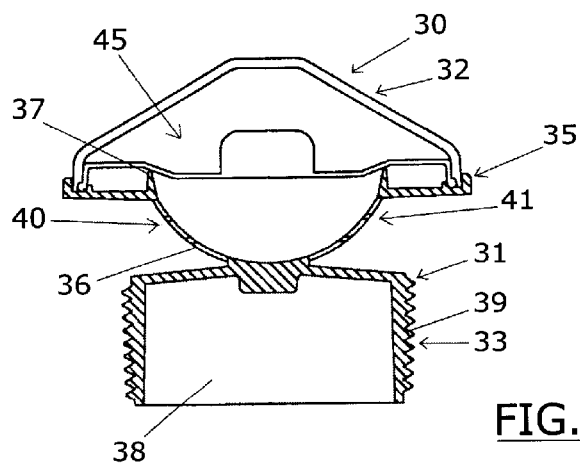
FIG. 19 is a sectional view of the air admittance valve taken along line 19—19 of FIG. 18.
Figure 20:
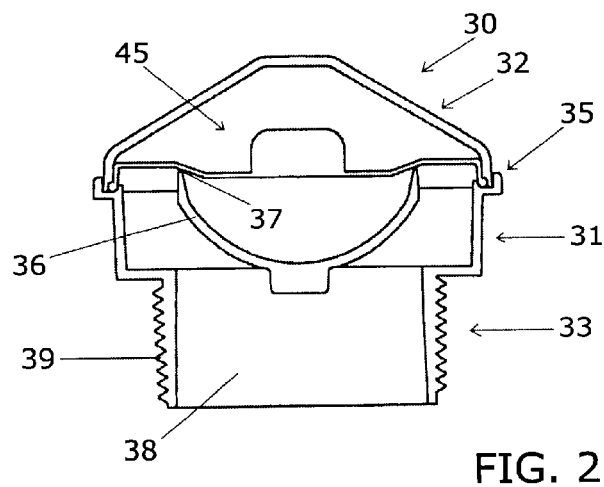
FIG. 20 is a sectional view taken along line 20—20 of FIG. 18.

Referring to FIGS. 18–20, another embodiment 30 of the one-way valve assembly is shown comprising a valve body 31 and a cap member 32 mounted thereon. The valve body 31 has a bottom connecting portion 33, an air inlet valve chamber 36 and a cap member 32. The valve body 31 having air inlet ports 40 and 41, upper connecting portion 35 and bottom portion 33 with internal air outlet 38 and external threads 39, is similar in structure and operation as the valve body 11 of assembly 10 described above. However, as shown, the sealing membrane 45 and cap member 32 are different in structure and operation.

Figure 19A:
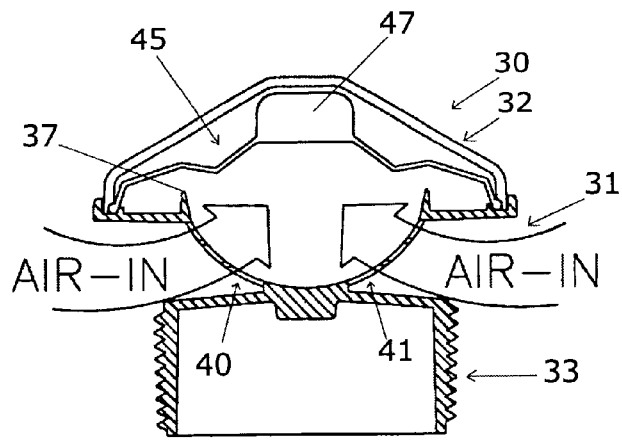
FIG. 19A is a sectional view of the valve assembly of FIG. 19 and showing the air inlet path of the air admittance valve.
Figure 21:
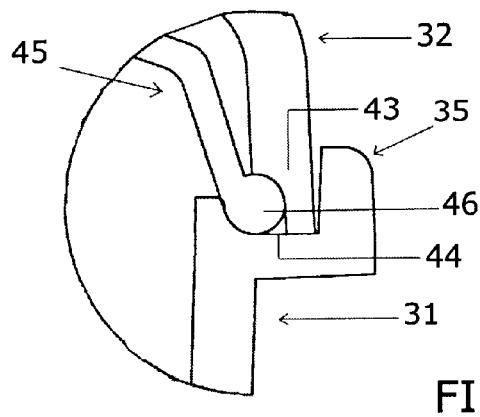
FIG. 21 is an enlarged view showing the sealing membrane of the air admittance valve assembly of FIG. 18 captured between the valve body and the valve cap.
Figure 20A:
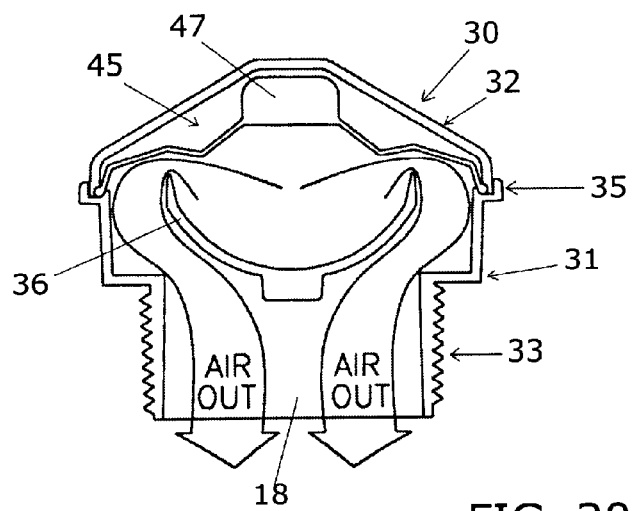
FIG. 20A is a sectional view of the valve assembly of FIG. 20 and showing the air admittance path from the valve assembly into the plumbing system.

In FIGS. 19A and 20A, the valve assembly 30 is shown to vent air into and out of the valve chamber 36 similar to the airflow path shown with respect to valve assembly 10 shown in FIGS. 2A and 3A. Sealing membrane 45 is shown upwardly moved from valve seat 37 to permit airflow through the valve body 31. Cap member 32 is shown aligning and positioning the sealing membrane 45 by holding the circumferential edge within upper connecting end 35 of valve body 31. As shown particularly in FIG. 21, the sealing membrane 45 has a formed peripheral ridge 46 which can be retained by either the cap member 32 or by the valve body 31. The sealing membrane only needs to be retained in this position. It does not require an air tight seal to either the cap or to the valve body.

Figure 22:
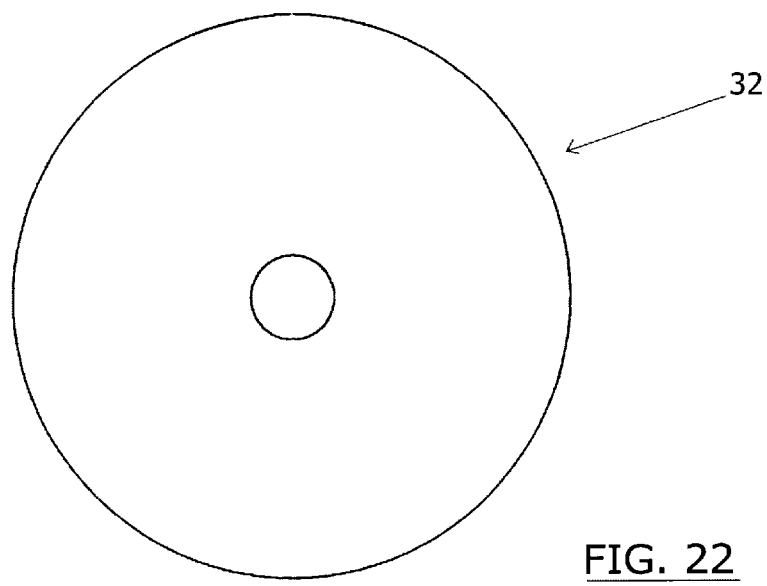
FIG. 22 is a top view of the cap member of the air admittance valve assembly of FIG. 18.
Figure 23:
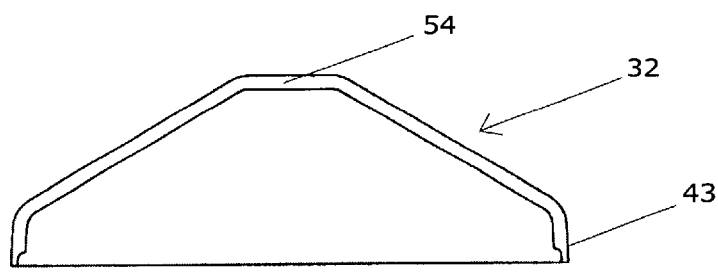
FIG. 23 is a sectional view of the cap member of FIG. 22.
Figure 24:
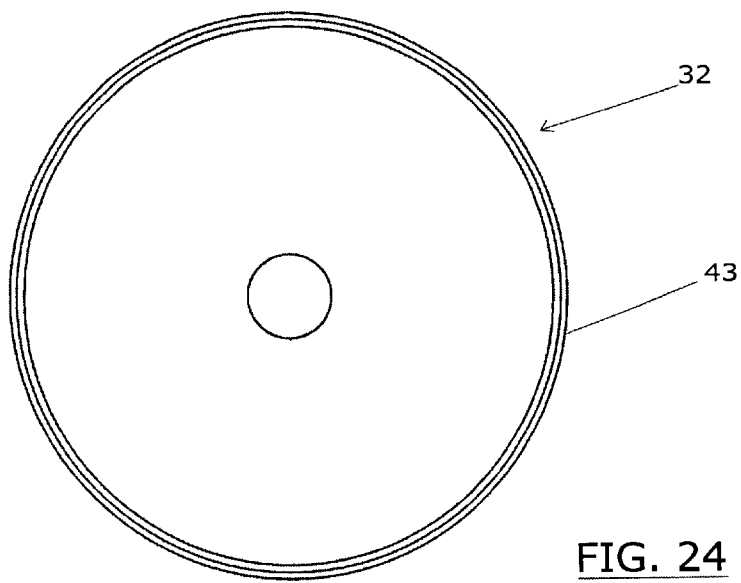
FIG. 24 is a bottom view of the cap member of FIG. 22.

In FIGS. 22–24 the cap member 32 is shown comprised of a circular unitary structure having a flattened triangular cross-sectional configuration. The cap member 32 is shown to have a flattened top portion 54 which is constructed and arranged to receive and guide the centrally disposed thickened 47 of sealing member 45. The unitary cap structure 32 and unitary valve body 31 are preferably molded of a plastic composition, such as PVC or the like.

Figure 25:
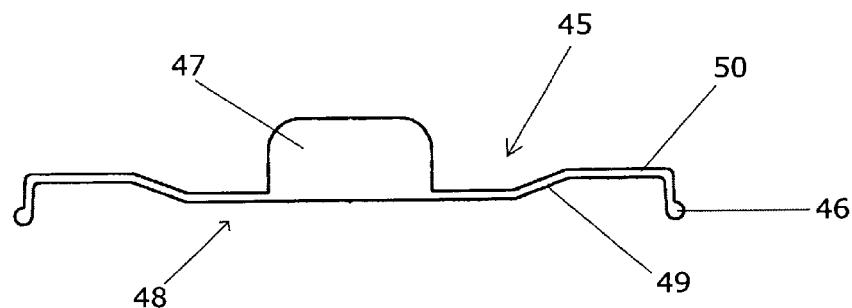
FIG. 25 is a sectional view of the sealing membrane taken along line 25—25 of FIG. 26.
Figure 26:
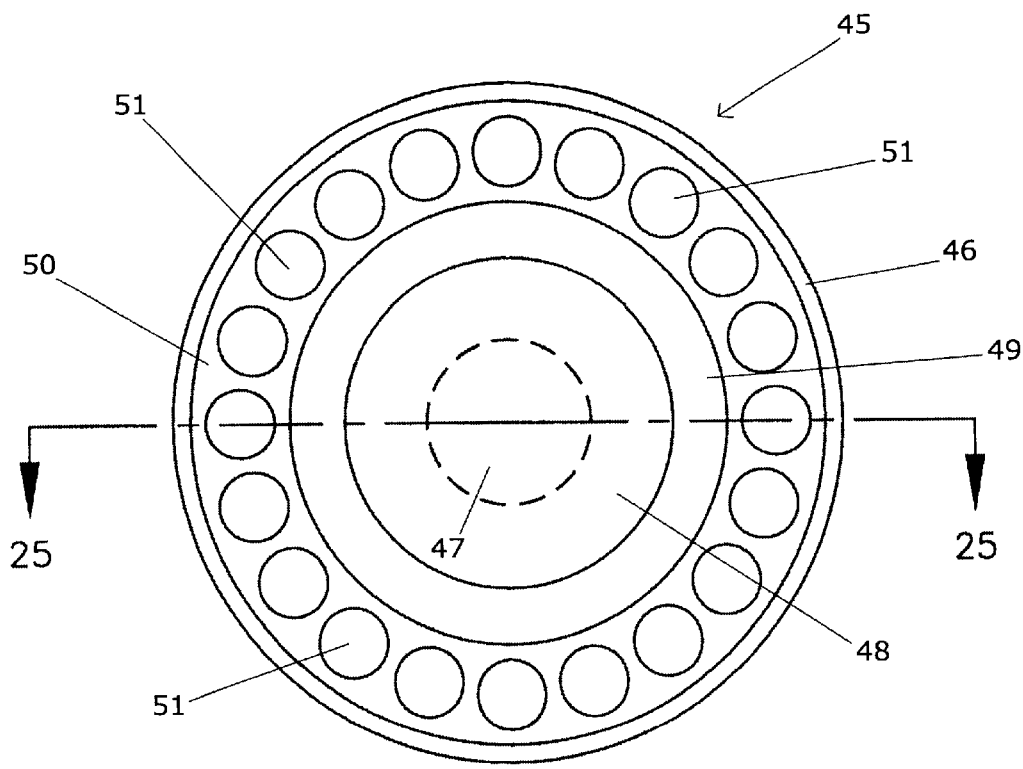
FIG. 26 is a bottom view of the sealing membrane of the air admittance valve assembly of FIG. 18.

In FIGS. 25 and 26 the sealing membrane 45 is shown comprised of a thin circular flexible structure having an inner area 48, a sloped concentric sealing area 49 and an outer concentric area 50 having a downwardly extending edge with a peripheral ridge 46. A cylindrical thickened portion 47 is shown centrally extending from the top surface of the sealing membrane 45. A plurality of spaced apertures 51 are shown in outer area 50 so that internal system pressure is operative above the sealing membrane 45 for proper function of the valve assembly. This cooperating arrangement permits the thickened and weighted portion 47 to flex the concentric and sloped sealing area 49 about the valve seat 37. The sloped sealing area 49 is preferably angled in a range of 20°–30° when viewed in a cross-section and with respect to a horizontal base line. The valve seat 37 may be angled so that the seat 37 is normal to the sloped sealing area 49 when the sealing membrane 45 is in the sealing position. The material composition of the sealing membrane is preferably a soft neoprene rubber or the like having a Shore-A durometer ranging from 15–30 and the thickness of the membrane is preferably approximately 0.030 inches.

In summary regarding both valve assembly embodiments discussed above, each utilizes a soft, flexible sealing membrane to seal in a tensioned state against a thin valve seat at a low negative pressure differential. For a sealing area having a 1.5 inch diameter, both sealing membranes have a weight of approximately 8–10 grams, i.e., the sealing membrane plus carrier structure in the first embodiment and the sealing membrane only in the second embodiment having the thickened center area. For other sealing areas, the membrane weight would be proportional to the area. The thin valve seat has a radius of approximately 0.003 inches having a relatively sharp edge without burs to provide a high contact pressure. Both sealing membrane embodiments have a thickness of approximately 0.030 inches, except for the thickened center of the second embodiment, and are constructed of a soft neoprene rubber or the like have a Shore-A durometer ranging from 15 to 30.

As many changes are possible to the embodiments of this invention utilizing the teachings thereof, the descriptions above and the accompanying drawings should be interpreted in the illustrative and not in the limited sense.

That which is claimed is:

1. A one-way valve assembly for preventing the escape of gases from a system while permitting the venting of ambient air into the system under vacuum conditions, said valve assembly comprising:

a) a valve body having an upper portion and a bottom portion for connection to and communication with the closed system, said upper portion having at least one air inlet portion communicating with the ambient environment;

b) a valve chamber positioned within said upper portion of said valve body, said valve chamber having a wall communicating with said at least one air inlet portion and said wall further having an upwardly extending valve seat forming a valve outlet portion between said valve seat and said valve body upper portion, said valve outlet portion being in communication with said valve body bottom portion;

c) a flexible sealing membrane having a generally thin unsupported sealing area positioned for sealing under tension said valve seat of said valve chamber; and d) a cap structure connected to said upper portion of said valve body, said cap structure having alignment means for positioning said flexible sealing membrane for movement with respect to said valve seat of said valve chamber.

2. The valve assembly of claim 1 wherein said alignment means is comprised of a slidable carrier member having an annular support portion, said sealing membrane being attached to said annular support structure of said slidable carrier member.

3. The valve assembly of claim 1 wherein said alignment means is comprised of said cap structure having a bottom peripheral end, said upper portion of said valve body having an upper peripheral ridge and said flexible sealing membrane having an outer peripheral edge, said outer peripheral edge of said flexible sealing membrane being captured between said upper peripheral ridge of said valve body and said bottom peripheral end of said cap structure.

4. The valve body of claim 2 wherein said sealing membrane is a thin flexible member which is fixed in a constrained state to said annular support of said carrier member.

5. The valve assembly of claim 3 wherein said flexible sealing membrane has a cross-sectional profile defining an outer portion, a sealing portion having said unsupported sealing area and a central portion and wherein said sealing portion is at a predetermined angle for flexible sealing engagement with said valve seat.

6. The valve assembly of claim 5 wherein said outer portion of said sealing membrane has at least one aperture.

7. The valve assembly of claim 1 wherein said wall of said valve chamber has a cupped configuration having apertures therethrough in communication with said at least one air inlet portion of said upper portion of said valve body.

8. The valve assembly of claim 7 wherein said valve body and said valve chamber are molded of a unitary structure comprised of a plastic composition, wherein said cap structure is molded of a unitary plastic composition and wherein said flexible sealing member is formed of an elastomeric material.

9. The valve assembly of claim 1 wherein said assembly is a cylindrical structure with said cap and valve body upper portion having a first diameter and said valve body lower portion having a second diameter and wherein said first diameter is greater than said second diameter.

10. The valve assembly of claim 6 wherein said central portion of said flexible sealing membrane has a centrally disposed thickened portion.

11. An air admittance valve for a plumbing drain and waste system comprising:
 a) a valve body having a centrally disposed air inlet chamber in communication with the ambient environment, said air inlet chamber having a wall with an upwardly extending peripheral wall edge forming a valve seat;
 b) a flexible, elastomeric tension sealing membrane having an unsupported sealing area positioned above said valve seat, said tension sealing membrane being constructed and arranged for flexibly sealing against said valve seat; and
 c) means to guide said sealing membrane with respect to said valve seat in said valve body.

12. The air admittance valve of claim 11 wherein said means to guide said sealing membrane is comprised of a carrier structure having an annular peripheral ridge and wherein said sealing membrane is attached to said peripheral ridge.

13. The air admittance valve of claim 12 wherein said carrier structure further comprises an axial hub and a plurality of structural ribs extending from said axial hub, said annular peripheral ridge being fixed to said structural ribs.

14. The air admittance valve of claim 13 wherein said valve seat has a circular configuration having a first diameter and said sealing membrane is circular and has a second diameter and wherein said second diameter is greater than said first diameter.

15. The air admittance valve of claim 14 wherein said sealing membrane has a thin, uniform thickness and wherein said sealing membrane is fixed to said carrier structure in a constrained state and being constructed and arranged to flexibly seal.

16. The air admittance valve of claim 15 wherein said means to guide said sealing membrane further comprises a guide post member positioned axially in said valve body.

17. The air admittance valve of claim 11 wherein said valve body includes a cap member and wherein said means to guide said sealing member is comprised of fixing said sealing member to said cap member.

18. The air admittance valve of claim 17 wherein said sealing member comprises a circular member having an inner thickened portion, a sloped intermediate portion having said unsupported sealing area and an outer portion having at least one aperture.

19. In an air admittance valve for connection to a plumbing system having a valve body with a peripheral air inlet, a valve structure comprising:
 a) a circular valve seat defining the termination of the air inlet in said valve body, said valve seat further comprising a thin sealing surface having a predetermined configuration;
 b) a carrier structure having an axial, centrally disposed guide means and a downwardly disposed outer ridge;
 c) a tension sealing membrane having an exterior edge portion attached to said outer ridge of said carrier structure, said tension sealing membrane having a generally thin unsupported sealing area aligned with said circular valve seat; and
 d) said valve structure being constructed and arranged whereby upon a negative pressure differential air is admitted to the valve body through said circular valve seat by the movement of said sealing membrane from said valve seat and whereby upon a pressure differential of zero or above said sealing membrane flexibly seals under tension said sealing surface of said valve seat to thereby seal a plumbing system.

20. The valve structure of claim 19 wherein said air admittance valve includes a valve chamber and wherein said valve seat has an angled configuration.

21. The valve structure of claim 19 wherein said carrier structure includes a plurality of structural rib members extending from said centrally disposed guide means to said outside ridge.

22. The valve structure of claim 19 wherein said valve body includes a cap structure having an axially aligned post member extending downwardly therefrom for guiding said carrier structure.

23. A process for venting into a closed system from the ambient environment comprising:
 a) connecting a one-way valve structure to the closed system, said valve structure having a valve body having a connecting end, a guided flexible tension sealing member with a generally thin unsupported sealing area and an internal valve chamber with a continuous valve seat in communication with the ambient environment;
 b) floating said flexible sealing member above the valve seat of the valve chamber upon a negative pressure differential in the closed system with respect to ambient pressure; and
 c) flexibly sealing in a state of tension said non-supported sealing area of said flexible membrane against the valve seat upon the equalization of pressure in the closed system.

24. The process of claim 23 wherein said valve structure is connected to a plumbing system.

25. The process of claim 24 wherein the valve body is provided with a cap member having guide means and wherein the flexible sealing member is guided by the cap member.

26. A fluid admittance valve assembly for a system comprising a valve body having an upper chamber, a fluid intake chamber, a lower chamber, a flexible tension diaphragm having a non-supported sealing area, and means for connecting said assembly to a system, said fluid intake chamber having a continuous wall terminating to form an upwardly disposed valve seat and means to communicate with the ambient environment, said flexible diaphragm being constructed and arranged for movement in said upper chamber and being positioned above said valve seat of said air intake chamber, said lower chamber being in fluid communication with said upper chamber, whereby said non-supported sealing area of said flexible diaphragm moves from and to a tensioned sealing engagement with said valve seat to equalize negative differentials between the ambient environment and the pressure of a system when in communication with said upper chamber of said valve body.

27. The fluid admittance valve assembly of claim 26 wherein said means to communicate with the ambient environment comprises at least one aperture in said continuous wall of said fluid intake chamber.

28. The fluid admittance valve assembly of claim 26 wherein said flexible diaphragm is in a tensioned state when sealing.

29. The fluid admittance valve assembly of claim 26 wherein said flexible diaphragm has a cross-sectional configuration having an outer portion, a sealing portion having said unsupported sealing area and a weighted inner portion and wherein said unsupported sealing area of said sealing portion is aligned with said valve seat.

30. The fluid admittance valve assembly of claim 26 wherein the valve body has a cap having a guide structure and wherein said flexible diaphragm is fixed to said guide structure.

31. The fluid admittance valve assembly of claim 30 wherein said guide structure includes a guide post attached to said cap and wherein said flexible diaphragm is fixed to said guide structure.

32. A gas admittance valve for allowing ambient gas into a system, said valve comprising:
   a) a centrally positioned gas intake chamber, said gas intake chamber further comprising at least one intake chamber wall, a means to communicate with the ambient gas, and a single valve seat defining an outlet and having an upwardly disposed top sealing edge;
   b) a valve chamber, said valve chamber having an interior surface; and said valve chamber being in communication with the system and with said gas intake chamber through the outlet defined by said valve seat;
   c) a flexible tension diaphragm having a thin unsupported sealing area positioned inside said valve chamber and above said valve seat, whereby said flexible diaphragm can move to engage and create a seal with said valve seat whenever a positive or no pressure differential exists and to disengage from said valve seat whenever a negative pressure differential exists; said flexible diaphragm having a periphery; and said thin unsupported sealing area of said flexible diaphragm being capable of conforming under tension to the top sealing edge of said valve seat; and
   d) a means for connecting said valve to the system.

33. The gas admittance valve of claim 32, wherein the means by which said gas intake chamber communicates with the ambient gas comprises at least one aperture through the at least one wall of said gas intake chamber.

34. The gas admittance valve of claim 32, wherein said flexible diaphragm maintains a tensional state when sealing.

35. The gas admittance valve of claim 32, further comprising a guide structure inside said valve chamber for guiding said flexible diaphragm toward and away from said valve seat.

36. A method for allowing ambient gas into a system, said method comprising the steps of:
   a) attaching a gas admittance valve to the end of a pipe that is part of the system, said gas admittance valve comprising:
      i) a centrally positioned gas intake chamber, said gas intake chamber further comprising at least one intake chamber wall, a means to communicate with the ambient gas, and a single valve seat defining an outlet and having an upwardly disposed top sealing edge;
      ii) a valve chamber, said valve chamber having an interior surface; and said valve chamber being in communication with the system and with said gas intake chamber through the outlet defined by said valve seat;
      iii) a flexible tension diaphragm having a non-supported and tensionable sealing area positioned inside said valve chamber and above said valve seat, whereby said flexible diaphragm can move to engage and create a seal with said valve seat whenever a positive or no pressure differential exists and to disengage from said valve seat whenever a negative pressure differential exists; said flexible diaphragm having a periphery; and said flexible diaphragm being capable of conforming to the top sealing edge of said valve seat; and
      iv) a means for connecting said valve to the system;
   b) providing make-up gas to the closed system when a negative pressure differential exists, as follows:
      i) allowing ambient gas into said gas intake chamber;
      ii) next allowing the ambient gas to raise said flexible diaphragm from and break its seal with said valve seat;
      iii) next allowing the ambient gas to flow into and through said valve chamber and into the closed system; and
      iv) causing said non-supported sealing area of said flexible diaphragm to reengage under a state of tension and reestablish a seal with said valve seat when the negative pressure differential no longer exists; and
   c) maintaining a seal between said tensioned sealing area of said flexible diaphragm and said valve seat when a positive or no pressure differential exists.

* * * * *